United States Patent [19]

Bordignon

[11] 4,328,936

[45] May 11, 1982

[54] MAGNETIC TAPE CASSETTE GASKET

[76] Inventor: Abramo Bordignon, Via Palmiro Togliatti, 32, Senago, Milano, Italy

[21] Appl. No.: 74,411

[22] Filed: Sep. 11, 1979

[30] Foreign Application Priority Data

Sep. 15, 1978 [IT] Italy .................. 22779/78[U]

[51] Int. Cl.³ .................. G03B 1/04; G11B 15/32
[52] U.S. Cl. ................... 242/199; 361/214
[58] Field of Search ................ 242/197–200; 361/214; 352/72–78; 360/96, 132

[56] References Cited

U.S. PATENT DOCUMENTS

| | | | |
|---|---|---|---|
| 3,601,654 | 8/1971 | Long et al. | 361/212 |
| 4,102,515 | 7/1978 | Milants | 242/199 |
| 4,127,242 | 11/1978 | Sasaki et al. | 242/199 |

FOREIGN PATENT DOCUMENTS

| | | | |
|---|---|---|---|
| 2501914 | 8/1975 | Fed. Rep. of Germany | 242/199 |
| 2732083 | 1/1978 | Fed. Rep. of Germany | 242/199 |

Primary Examiner—Leonard D. Christian
Attorney, Agent, or Firm—Guido Modiano; Albert Josif

[57] ABSTRACT

A magnetic tape cassette comprises a shaped sheet the face thereof contacting the magnetic tape includes lubricating material treated portions located at the top of ridges formed by deforming the sheet.

2 Claims, 4 Drawing Figures

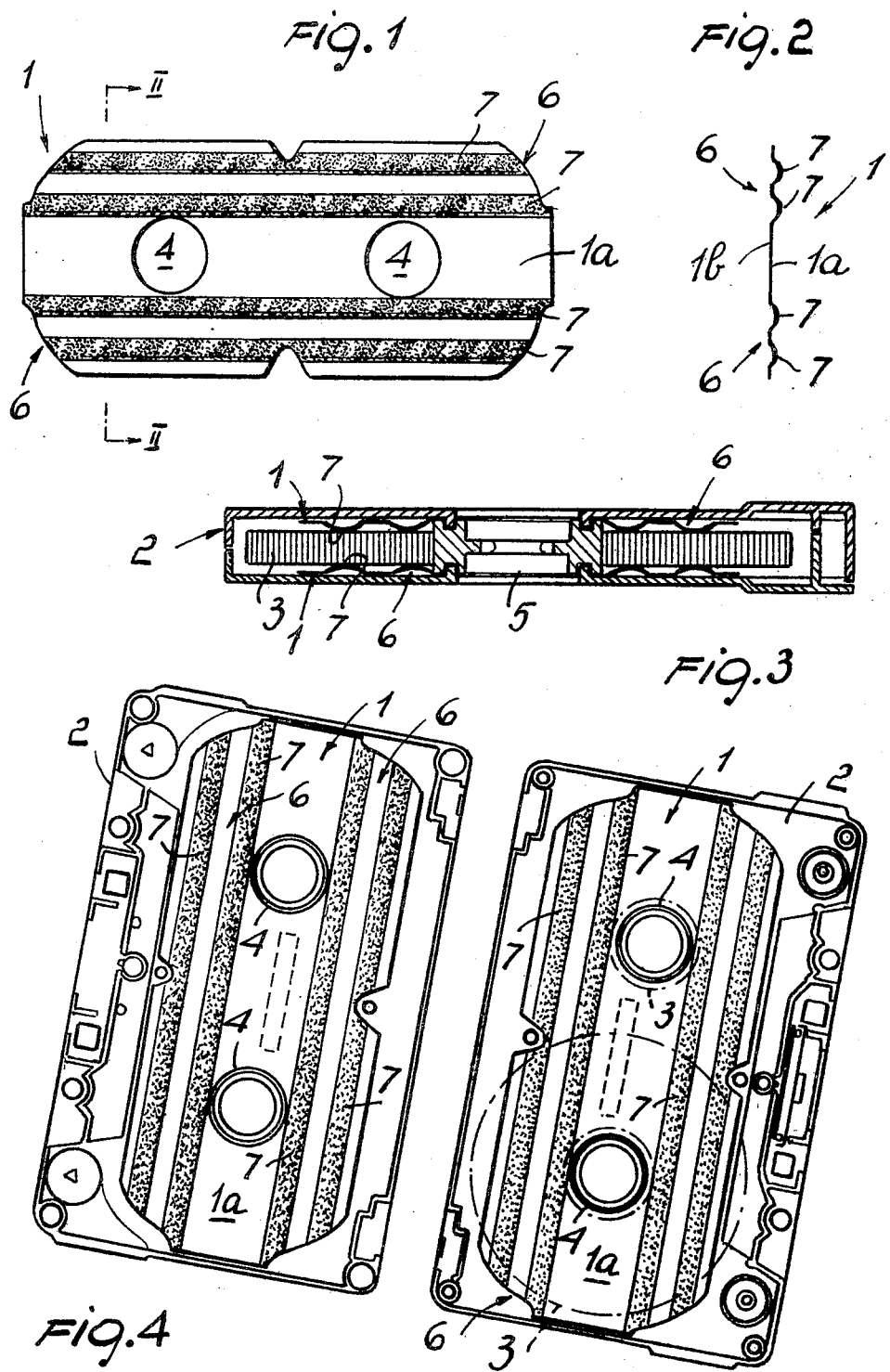

MAGNETIC TAPE CASSETTE GASKET

BACKGROUND OF THE INVENTION

This invention relates to a gasket for magnetic tape packages, known as "cassettes", as employed in tape recorders, players, and the like apparatus.

As is known, magnetic tape playing or recording cassettes include a case, wherein the tape is wound around two pins, thus forming two coils. The coils do not contact directly, with their edge portions, the inner surfaces of the case, but are arranged to contact gaskets, which are substantially plastics material sheet gaskets shaped to fit the case contour. These gaskets have a basic feature in common: their faces contacting the magnetic tape have a graphite coated surface, or surface coated with an equivalent lubricating material. Thus, the gaskets serve the function of a bearing between the tape and case which improves the sliding of the magnetic tape.

Such gaskets are necessary to the proper operation of a cassette, but have the disadvantage of increasing the cost of the cassettes. Therefore, the present trend is towards the maximum simplification and rationalization of the gasket structure in order to reduce the cost thereof with least prejudice for their functionality.

In particular, the trend is towards a standardized shape of the gaskets, to fit cassettes of any shape, as well as, and above all, a reduction to the least possible amount of the graphite or equivalent material. In fact, solutions have been proposed where the central strip of the gaskets is left free of graphite which comprises the bores for the pins, or where the graphite is laid grate-like on the gasket. Thus, the use of graphite is effectively reduced with respect to fully coated gaskets, although a considerable amount of graphite is still used, and above all, this graphite can remain unused if the cassette case happen to be imperfectly true or flat, or if the coil has been irregularly coiled, thereby it cannot contact the graphite-coated surface evenly.

SUMMARY OF THE INVENTION

The instant invention sets out to provide for the elimination of the cited drawbacks.

Within that general aim, it is possible to arrange that the amount of graphite, or other lubricating material, required be reduced, without affecting the overall lubricating action of the gasket on the magnetic tape.

It is further possible to arrange that the gasket according to the invention is so structured as to make the contact between the graphite deposited thereon and the magnetic tape coils a substantially uniform one.

It is further possible to provide a gasket which, through a supporting action of its own, favors the formation of magnetic tape coils which are coiled in a uniform manner.

According to one aspect of the present invention, there is provided a gasket for magnetic tape cassettes comprising a shaped sheet, the face whereof which contacts the magnetic tape includes portions treated with a lubricating material, characterized in that said treated portions are located at the tops of raised portions formed by deformation of said sheet and extending towards said tape such as to reduce the surface area of said gasket in contact with the magnetic tape.

BRIEF DESCRIPTION OF THE DRAWING

Further features and advantages will be more clearly understood from a description of a preferred embodiment of the invention, illustrated by way of example in the accompanying drawings, where:

FIG. 1 is a view of the gasket according to the invention;

FIG. 2 is a sectional view of the gasket of FIG. 1, taken along the line II—II;

FIG. 3 is a sectional enlarged view, with respect to previous figures, of a cassette with the magnetic tape coils arranged between two gaskets as shown in the previous figures; and FIG. 4 shows, to the same scale as FIGS. 1 and 2, the cassette case in its open condition and including two gaskets according to this invention.

DESCRIPTION OF THE PREFERRED EMBODIMENTS

With reference to the cited drawing figures, the improved construction gasket for cassette according to the invention comprises a shaped sheet 1 of a plastics material having a first face 1a, facing inwardly to a case 2 of a magnetic tape cassette, as shown in FIG. 1, and a second face 1b, located oppositely to the first and resting on the walls of the case 2. The first face 1a is in contact with coils 3 of a magnetic tape, as illustrated in FIGS. 3 and 4.

FIG. 1 illustrates in particular the shape of the sheet 1, as cutout at the edges and bored centrally with two bores or holes 4 adapted for the insertion of pins 5 or winding hubs therethrough, around which pins the magnetic tape is coiled into coils or winding 3.

The shaped sheet 1 has a plurality of raised portions 6 generated by deformation of the sheet 1, which thus appears, in cross-section, no longer flat but rather having a certain thickness of bulk (FIGS. 2 and 3).

Advantageously, these raised portions have a very simple structure: they have a linear pattern all across the shaped sheet, parallel to a line joining the bores 4, and in cross-section, follow an arcuate pattern free from sharp edges. The raised portions 6 are provided symmetrically with respect to said line joining the bores 4, e.g. four in number. In other words the gasket has a corrugatted shape with rectilinear parallel corrugations.

According to one aspect of the invention, the graphite or other material for lubricating the magnetic tape is arranged i.e. coated on the first face 1a of the sheet 1, right at the tops of the raised portions 6, on the first face 1a. The treated or coated portions on the sheet 1, as indicated at 7, thus assume the shape of strips extending parallel to one another, the length whereof may be continuous or even discontinuous. These strips are raised over the resting surface of the gaskets on the case 2: FIG. 3 evidences how a magnetic tape coil 3 only and directly contacts the graphite-coated portions 7 and no other parts of the sheet 1.

Advantageously, the gasket can be further improved by providing an antistatic paint on the second face 1b, opposed to the one coated with graphite. The antistatic paint may also be deposited limited to the more protruding areas of the second face, in practice located at strips or bands between the raised portions 6.

The operation and use of the gaskets according to the invention will be clearly apparent from the foregoing.

The magnetic tape coils 3 are contained and resiliently supported in their correct positions by the shaped sheets 1, thanks to the provision for the raised portions 6 which apply a sort of elastic action against the squeezing thereof, as shown in FIG. 3. The very tops of the raised portions 6, which contact the coils 3, are coated with graphite, thereby the contact between the magnetic tape coils 3 and shaped sheets 1 occurs with an extremely reduced amount of friction. Specifically, the contact surfaces have an extremely reduced area, and the amount of graphite or the like, coated on the shaped sheet 1, is minimal since all other surface portions of the shaped or corrugated sheets or films and distinct from the the top portions of the corrugations thereof are not lubricated i.e. are without the lubricating coating. Advantageously, this minimal amount of graphite is fully made use of by the magnetic tape, in contact therewith throughout its extension.

On the opposite face to the one coated with graphite, the anti-static paint has the important function of preventing the gaskets from sticking to each other, when stacked, owing to the formation of electrostatic charges.

The invention, as indicated, is susceptible to many modifications and variations, which are all within the scope of the instant inventive concept.

In practicing the invention, the materials employed may be any ones, provided that the previously mentioned conditions are fulfilled, as any ones may be the dimensions.

I claim:

1. In a cassette for magnetic tape recording, having a casing with opposite walls, between which winding hubs for a tape winding are captured, a corrugated plastic film gasket located between the tape winding and the opposite walls respectively, wherein according to the improvement the corrugations of said plastic film have each a top portion in direct slidable engagement with the tape winding and wherein said top portions have a coating of lubricating substance thereon and wherein said corrugated plastic film has other surface portions distinct from said top portions and wherein said other distinct portions are without said coating of lubricating substance.

2. A gasket according to claim 1, wherein the corrugations are rectilinear and extend parallel to a longitudinal extension of the cassette.

* * * * *